United States Patent
Wang

(10) Patent No.: US 8,190,879 B2
(45) Date of Patent: May 29, 2012

(54) GRACEFUL CONVERSION OF A SECURITY TO A NON-SECURITY TRANSPARENT PROXY

(75) Inventor: Jianxin Wang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 12/641,077

(22) Filed: Dec. 17, 2009

(65) Prior Publication Data

US 2011/0154019 A1 Jun. 23, 2011

(51) Int. Cl.
*H04L 29/06* (2006.01)

(52) U.S. Cl. .......................................... 713/153; 726/12

(58) Field of Classification Search .......... 713/150–153; 726/11–14; 380/277; 370/401
See application file for complete search history.

(56) References Cited

U.S. PATENT DOCUMENTS

| | | | | |
|---|---|---|---|---|
| 5,915,087 | A * | 6/1999 | Hammond et al. | 726/12 |
| 7,237,261 | B1 * | 6/2007 | Huber et al. | 726/12 |
| 7,506,368 | B1 * | 3/2009 | Kersey et al. | 726/12 |
| 7,966,659 | B1 * | 6/2011 | Wilkinson et al. | 726/22 |
| 2007/0263874 | A1 * | 11/2007 | Harran et al. | 380/277 |
| 2008/0126794 | A1 * | 5/2008 | Wang et al. | 713/151 |
| 2008/0235508 | A1 | 9/2008 | Ran et al. | |
| 2008/0301429 | A1 * | 12/2008 | Santanu et al. | 713/150 |
| 2009/0013399 | A1 * | 1/2009 | Cottrell et al. | 726/12 |
| 2009/0265541 | A1 * | 10/2009 | Ylitalo et al. | 713/151 |

FOREIGN PATENT DOCUMENTS

EP 1 263 186 A2 12/2002

OTHER PUBLICATIONS

T. Dierks and E. Rescorla, "The Transport Layer Security (TLS) Protocol Version 1.1," RFC 4346, The Internet Society, Apr. 2006 (87 pages).
T. Dierks and E. Rescorla, "The Transport Layer Security (TLS) Protocol Version 1.2," RFC 5246, The Internet Society, Aug. 2008 (104 pages).
European Patent Office, Extended European Search Report, Application No. 10195804.9, Apr. 12, 2011 (4 pages).
Applicant's Response to Extended European Search Report, Application No. 10195804.9, Dec. 13, 2011 (18 pages).

* cited by examiner

*Primary Examiner* — Hadi Armouche
(74) *Attorney, Agent, or Firm* — The Law Office of Kirk D. Williams

(57) ABSTRACT

A graceful conversion of a security to a non-security transparent proxy is performed. A security transparent proxy is an intermediary between two end devices, with an established secure connection with each end device using different security keys. In response to a policy decision or other stimulus, the security transparent proxy is gracefully converted to a non-security transparent proxy such that it can forward, without decrypting and encrypting, the information received from a first endpoint on the first connection therewith to the second endpoint on the second connection therewith. This conversion is "graceful" in that it does not drop either of the two original sessions. In one embodiment, this graceful conversion is accomplished by triggering a key renegotiation on both of the two sessions such that the two connections will use the same encryption key.

17 Claims, 5 Drawing Sheets

GRACEFUL CONVERSION OF A SECURITY TO A NON-SECURITY TRANSPARENT PROXY

TECHNICAL FIELD

The present disclosure relates generally to communications systems.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Encryption technologies, such as Secure Sockets Layer (SSL) or Transport Layer Security (TLS), are used for transporting information across packet networks. However, this prevents devices, such as corporate edge devices and firewalls, from looking at the unencrypted information being communicated therein. To avoid this situation, these edge devices sometimes act as a transparent proxy in the middle of the communication between the endpoints. This intermediate device establishes a secure connection with each of the two endpoints, and transparently bridges these connections. To accomplish this, the intermediate device receives the encrypted information on a first session from the first endpoint, decrypts it using a key associated with the first session, possibly examines it to determined that is allowed (if not then prevents it from being forwarded to the second endpoint), encrypts the information using a second key associated with the second session, and forwards this second encrypted information to the other endpoint. To the endpoints, their connection appears to span end-to-end with the other endpoint.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
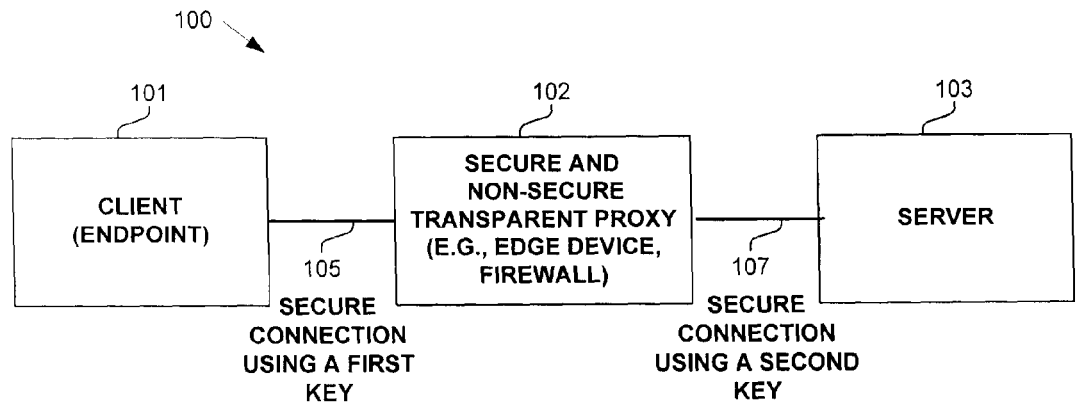
FIG. 1 illustrates a network operating according to one embodiment.

Disclosed are, inter alia, methods, apparatus, computer-storage media, mechanisms, and means associated with the graceful conversion of a security to a non-security transparent proxy. A security transparent proxy is an intermediary between two end devices, with an established secure connection with each end device using different security keys. The security transparent proxy decrypts information received from one endpoint, possibly performs some security or other processing, and if not dropped, encrypts the information using the different key associated with the second endpoint, and sends this newly encrypted information to the second endpoint. In response to a policy decision or other stimulus, the security transparent proxy is gracefully converted to a non-security transparent proxy such that it can forward, without decrypting and encrypting, the information (e.g., packets) received from a first endpoint on the first connection therewith to the second endpoint on the second connection therewith. This conversion is "graceful" in that it does not drop either of the two original sessions. In one embodiment, this graceful conversion is accomplished by triggering a key renegotiation on both of the two sessions such that the two connections will use the same encryption key.

2. Description

Disclosed are, inter alia, methods, apparatus, computer-storage media, mechanisms, and means associated with the graceful conversion of a security to a non-security transparent proxy. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processing elements, ASICs, methods, and computer-readable media containing instructions. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although any embodiment may include some, all or none of the features, elements and/or limitations described in relation to a particular different one embodiment. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Note, nothing described or referenced in this document is admitted as prior art to this application unless explicitly so stated.

Disclosed are, inter alia, methods, apparatus, computer-storage media, mechanisms, and means associated with the graceful conversion of a security to a non-security transparent proxy. A security transparent proxy is an intermediary between two end devices, with an established secure connection with each end device using different security keys. The security transparent proxy decrypts information received from one endpoint, possibly performs some security or other processing, and if not dropped, encrypts the information using the different key associated with the second endpoint, and sends this newly encrypted information to the second endpoint. In response to a policy decision or other stimulus, the security transparent proxy is gracefully converted to a non-security transparent proxy such that it can forward, without decrypting and encrypting, the information (e.g., packets) received from a first endpoint on the first connection therewith to the second endpoint on the second connection therewith. This conversion is "graceful" in that it does not drop either of the two original sessions. In one embodiment, this graceful conversion is accomplished by triggering a key renegotiation on both of the two sessions such that the two connections will use the same encryption key.

One embodiment includes a method, performed by a particular machine, with the method comprising: acting, by the particular machine, as a security transparent proxy, including using decryption and encryption, to bridge packets of a first secure session with a client and packets of a second secure session with a server, with the first secure session using a first key, and with the second secure session using a second key different than the first key; while said acting as the security transparent proxy, initiating key renegotiation resulting in the client, with the first secure session, and the server, with the second secure session, using a same particular key; and subsequent to said key renegotiation: acting as a non-security transparent proxy including: receiving packets from the first secure session and forwarding, without decrypting nor encrypting using the particular key, to the server over the second secure session, and receiving packet from the second secure session and forwarding, without decrypting nor encrypting using the particular key, to the client over the first secure session, such that neither the first secure session nor the second secure session is dropped between said acting as the security transparent proxy to acting as a non-security transparent proxy.

In one embodiment, the first key is not the same as the particular key; and the second key is not the same as the particular key. In one embodiment, the first key is the same as the particular key. In one embodiment, the second key is the same as the particular key. In one embodiment, the first secure session uses one from a group consisting of: Secure Sockets Layer (SSL) and Transport Layer Security (TLS); and the second secure session uses one from a group consisting of: SSL and TLS. In one embodiment, said key renegotiation is performed in response to identifying based on a policy decision that the particular machine should not act as said security transparent proxy. In one embodiment, said policy decision is defined based on one or more from a group consisting of: in an access control list, using the identity of the client, using the identity of the server, using the reputation of the client, and using the reputation of the server. In one embodiment, said key renegotiation includes the particular machine acting as the security transparent proxy including using decryption and encryption to bridge key renegotiation packets sent between the client and the server. In one embodiment, the particular machine switches to acting as the non-security transparent proxy in response to identifying completion of said key renegotiation resulting in the client and server using the same particular key by monitoring said key renegotiation packets sent between the client and the server. In one embodiment, the particular machine switches to acting as the non-security transparent proxy in response to identifying completion of said key renegotiation resulting in the client and server using the same particular key by monitoring said key renegotiation packets sent between the client and the server.

One embodiment includes an apparatus, comprising: one or more network interfaces configured to communicate with a client and with a server; and one or more processors and memory configured to perform operations, with said operations including: acting as a security transparent proxy, including using decryption and encryption, to bridge packets of a first secure session with a client and packets of a second secure session with a server, with the first secure session using a first key, and with the second secure session using a second key different than the first key; while said acting as the security transparent proxy, initiating key renegotiation resulting in the client, with the first secure session, and the server, with the second secure session, using a same particular key; and subsequent to said key renegotiation: acting as a non-security transparent proxy including: receiving packets from the first secure session and forwarding, without decrypting nor encrypting using the particular key, to the server over the second secure session, and receiving packet from the second secure session and forwarding, without decrypting nor encrypting using the particular key, to the client over the first secure session, such that neither the first secure session nor the second secure session is dropped between said acting as the security transparent proxy to acting as a non-security transparent proxy.

In one embodiment, the first key is not the same as the particular key; and the second key is not the same as the particular key. In one embodiment, the first secure session uses one from a group consisting of: Secure Sockets Layer (SSL) and Transport Layer Security (TLS); and the second secure session uses one from a group consisting of: SSL and TLS. In one embodiment, the apparatus switches to acting as the non-security transparent proxy in response to identifying completion of said key renegotiation resulting in the client and server using the same particular key by monitoring said key renegotiation packets sent between the client and the server. In one embodiment, said key renegotiation is performed in response to identifying based on a policy decision that the apparatus should not act as said security transparent proxy. In one embodiment, said key renegotiation includes the apparatus acting as the security transparent proxy including using decryption and encryption to bridge key renegotiation packets sent between the client and the server. In one embodiment, the apparatus switches to acting as the non-security transparent proxy in response to identifying completion of said key renegotiation resulting in the client and server using the same particular key by monitoring said key renegotiation packets sent between the client and the server.

One embodiment includes an apparatus, comprising: means for acting as a security transparent proxy, including using decryption and encryption, to bridge packets of a first secure session with the client and packets of a second secure session with the server, with the first secure session using a first key, and with the second secure session using a second key different than the first key; means for causing key renegotiating with the client to use a particular key with the first secure session and key renegotiating with the server to use the particular key with the second secure session; and means acting, after said key renegotiations with the client and the server, as a non-security transparent proxy including: receiving packets from the first secure session and forwarding, without decrypting and encrypting using the particular key, to the server over the second secure session, and receiving packet from the second secure session and forwarding, without decrypting and encrypting using the particular key, to the client over the first secure session; wherein neither the first secure session nor the second secure session is dropped between said acting as the security transparent proxy to acting as a non-security transparent proxy.

In one embodiment, the first key is not the same as the particular key; and the second key is not the same as the particular key. In one embodiment, said key renegotiation includes the apparatus acting as the security transparent proxy including using decryption and encryption to bridge key renegotiation packets sent between the client and the server; and the apparatus switches to acting as the non-security transparent proxy in response to identifying completion of said key renegotiation resulting in the client and server using the same particular key by monitoring said key renegotiation packets sent between the client and the server.

Expressly turning to the figures, FIG. 1 illustrates a network 100 operating according to one embodiment. Shown are a first endpoint (e.g., client) 101, intermediary secure and non-security transparent proxy (e.g., edge device, firewall), and second endpoint (e.g., server) 103. Between endpoint 101 and intermediary transparent proxy 102 is a first secure connection 105 encrypted using a first key. Between endpoint 103 and intermediary transparent proxy 102 is a first secure connection 107 encrypted using a second key. Typically the first and second keys are initially different. Therefore, intermediary transparent proxy 102 must act as a "secure" transparent proxy by: decrypting, using the first key, information received over secure connection 105 and then encrypting it using the second key and forwarding over secure connection 107; and (vice versa) decrypting, using the second key, information received over secure connection 107 and then encrypting it using the first key and forwarding over secure connection 105.

By decrypting this information, intermediary device 102 has access to the native information, which may not be desirable. Additionally, it may be determined that intermediary device 102 no longer needs to inspect the information and/or does not need to expend the resources to decrypt and encrypt the communicated information. Therefore, the intermediary device 102 should be converted from a security transparent proxy (which decrypts, encrypts, and forwards the information) to a non-security transparent proxy (which forwards the information without decrypting and encrypting it). It is desirable that this conversion be graceful; in other words, that neither secure connection 105 nor 107 are dropped. In one embodiment, this graceful conversion is accomplished by triggering a key renegotiation on both of the two sessions such that the two connections will use the same encryption key, which will allow transparent proxy 102 to forward the information without having to continue decrypting and encrypting it.

Figure 2:
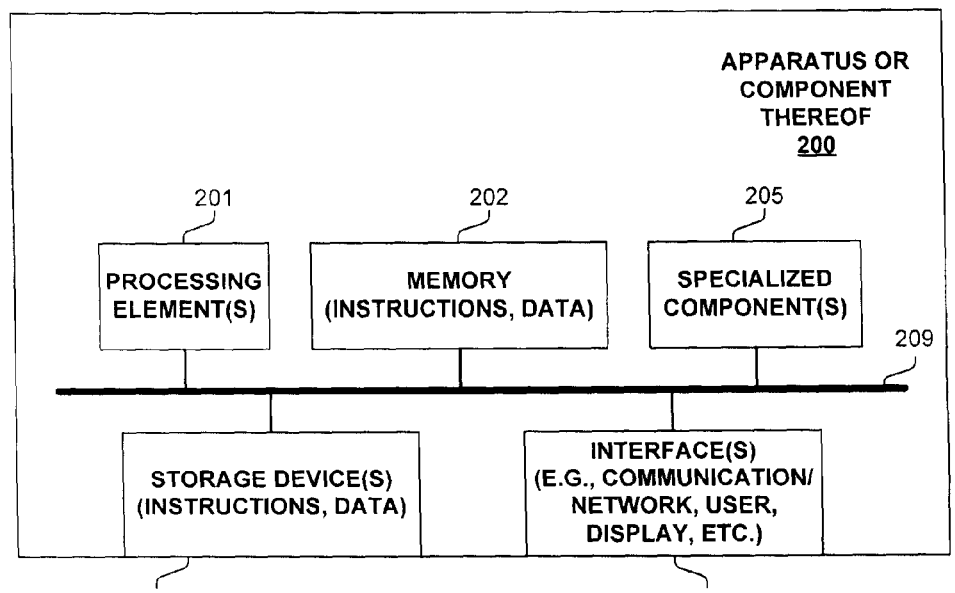
FIG. 2 illustrates an apparatus or component used in one embodiment.

FIG. 2 is block diagram of an apparatus or component 200 used in one embodiment associated with the graceful conversion of a security to a non-security transparent proxy. In one embodiment, apparatus or component 200 performs one or more processes corresponding to one of the flow diagrams illustrated or otherwise described herein.

In one embodiment, apparatus or component 200 includes one or more processing elements 201, memory 202, storage device(s) 203, specialized component(s) 205 (e.g. optimized hardware such as for performing encryption and decryption operations, etc.), and interface(s) 207 for communicating information (e.g., sending and receiving packets, user-interfaces, displaying information, etc.), which are typically communicatively coupled via one or more communications mechanisms 209, with the communications paths typically tailored to meet the needs of the application. In one embodiment apparatus or component 200 corresponds to, or is part of, one or more particular machines, clients, transparent proxies, clients or other devices described herein.

Various embodiments of apparatus or component 200 may include more or less elements. The operation of apparatus or component 200 is typically controlled by processing element (s) 201 using memory 202 and storage device(s) 203 to perform one or more tasks or processes. Memory 202 is one type of computer-readable/computer-storage medium, and typically comprises random access memory (RAM), read only memory (ROM), flash memory, integrated circuits, and/or other memory components. Memory 202 typically stores computer-executable instructions to be executed by processing element(s) 201 and/or data which is manipulated by processing element(s) 201 for implementing functionality in accordance with an embodiment. Storage device(s) 203 are another type of computer-readable medium, and typically comprise solid state storage media, disk drives, diskettes, networked services, tape drives, and other storage devices. Storage device(s) 203 typically store computer-executable instructions to be executed by processing element(s) 201 and/or data which is manipulated by processing element(s) 201 for implementing functionality in accordance with an embodiment.

Figure 3:
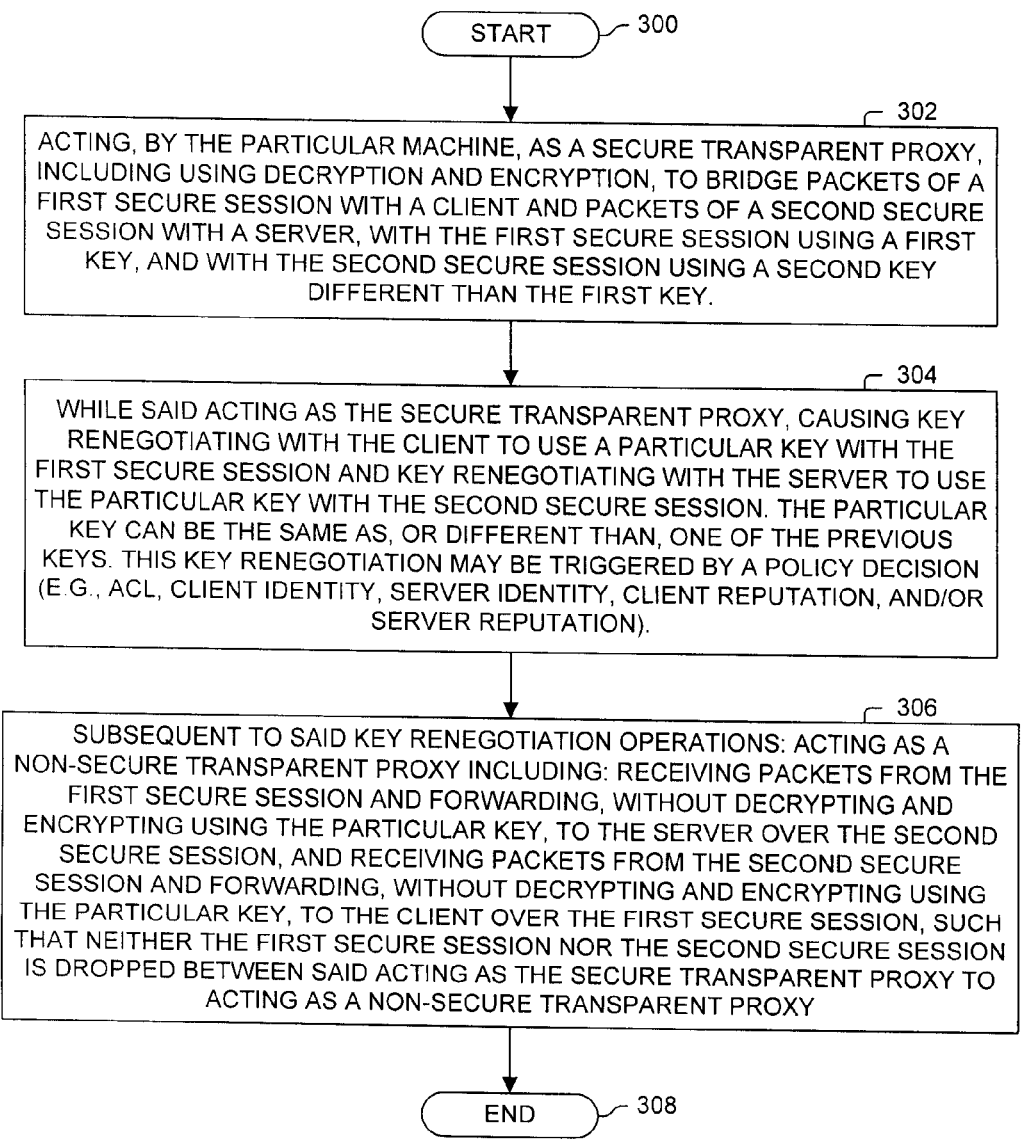
FIG. 3 illustrates a process performed in one embodiment.

FIG. 3 illustrates a process performed in one embodiment. Processing begins with process block 300. In process block 302, the particular machine (e.g., firewall, edge device, router, switch, computer, etc.) acts as a security transparent proxy, including using decryption and encryption (e.g., SSL, TLS), to bridge packets of a first secure session with a client and packets of a second secure session with a server, with the first secure session using a first key, and with the second secure session using a second key different than the first key. In process block 304, while said acting as the security transparent proxy, the particular machine causes key renegotiating with the client to use a particular key with the first secure session and key renegotiating with the server to use the particular key with the second secure session. The particular key can be the same as, or different than, one of the previous keys. This key renegotiation may be triggered by a policy decision (e.g., ACL, client identity, server identity, client reputation, and/or server reputation). In process block 306, subsequent to said key renegotiation operations: the particular machine receives packets from the first secure session and forwards, without decrypting and encrypting using the particular key, to the server over the second secure session, and receives packets from the second secure session and forwards, without decrypting and encrypting using the particular key, to the client over the first secure session, such that neither the first secure session nor the second secure session is dropped from said acting as the security transparent proxy operation. Processing of the flow diagram of FIG. 3 is complete as indicated by process block 308.

Figure 4A:
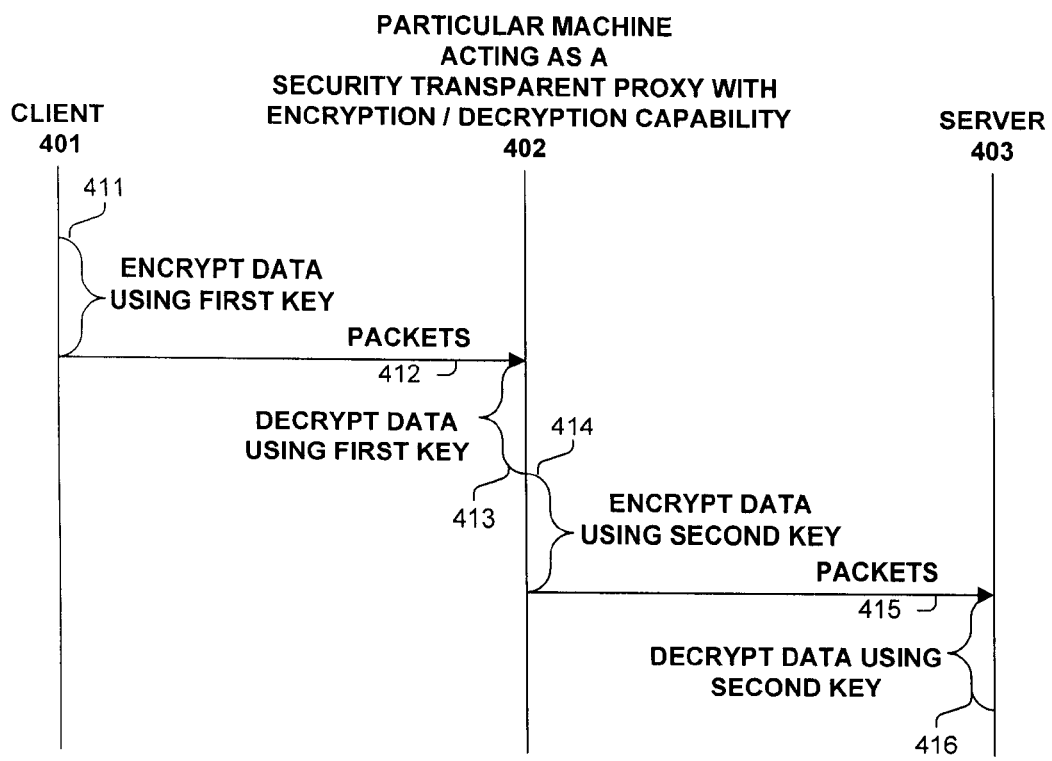
FIG. 4A illustrates a process performed in one embodiment.

FIG. 4A illustrates a process performed in one embodiment, with a client (e.g., endpoint) 401, a particular machine acting as a security transparent proxy 402 (e.g., using its encryption and decryption capabilities), and a server (e.g., endpoint) 403. First, Client 401 encrypts (411) data using the first key, which is then sent (412) as packets through the first secure connection to security transparent proxy 402. Transparent proxy 402 decrypts (413) this information using the first key; (optionally performs some inspection and processing to determine whether or not it should be forwarded); encrypts (414) this information using the second key, which is then sent (415) as packets through the second secure connection to Server 403, which decrypts (416) it using the second key. (Note, this process also operates in the reverse direction from Server 403 to Client 401).

Figure 4B:
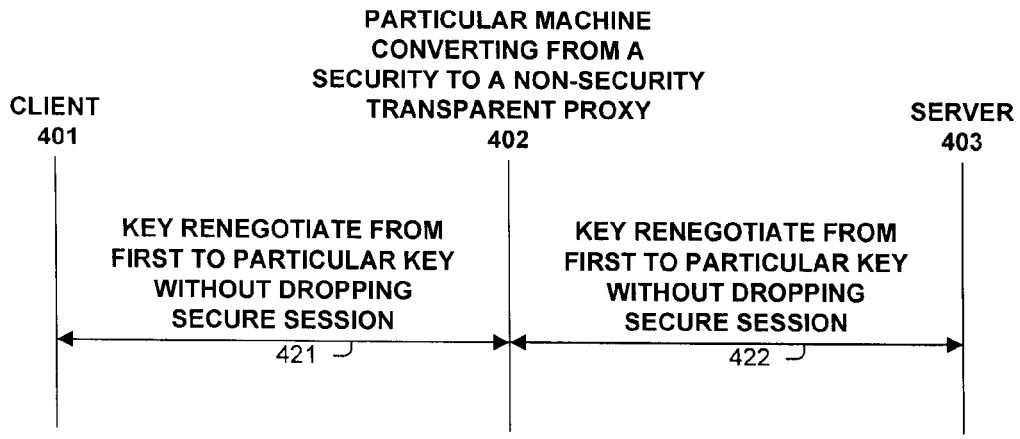
FIG. 4B illustrates a process performed in one embodiment.

FIG. 4B illustrates a process performed in one embodiment. Particular Machine 402, while still acting as a security transparent proxy, causes (421, 422) a renegotiation of the keys used with the first and second secure communications sessions with Client 401 and Server 403, such that they will subsequently use the same particular key. This renegotiation occurs without dropping either of the two secure sessions.

Figure 4C:
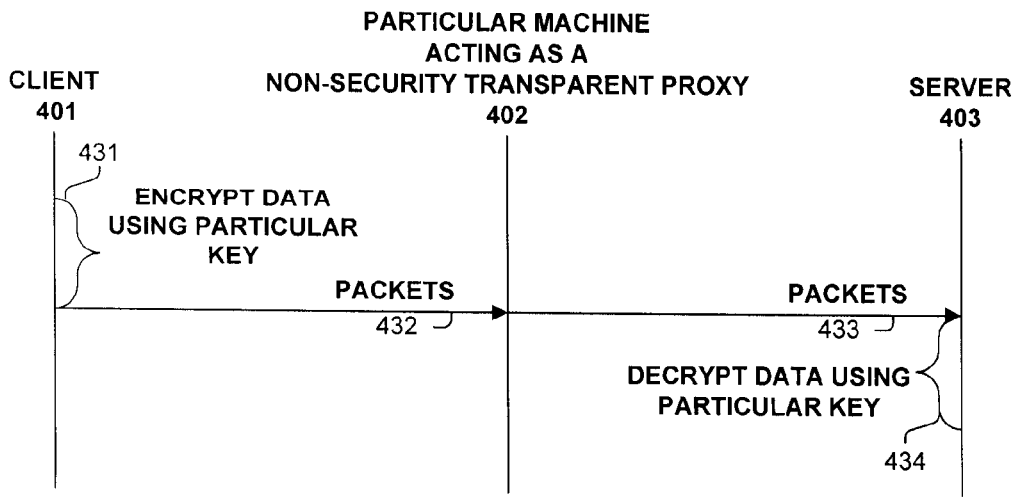
FIG. 4C illustrates a process performed in one embodiment.

FIG. 4C illustrates a process performed in one embodiment. Once the two secure communications sessions between the Particular Machine 402 and Client 401 and Server 403 are using a same particular key for their encryption, Particular Machine 402 no longer needs to act as a security transparent proxy that receives information from a first endpoint (401, 403), decrypts it using a first key, encrypts it using a different key, and forwards to the other endpoint (401, 403). Thus Particular Machine 402 can act as a non-security transparent proxy, such as illustrated in FIG. 4C. Client 401 encrypts (431) information using the particular key, which is then sent (432) as packets through the first security connection to non-security transparent proxy 402, which forwards, without decrypting and encrypting, these packets (433) to Server 403, which decrypts (434) the packet using the same particular key.

Figure 5:
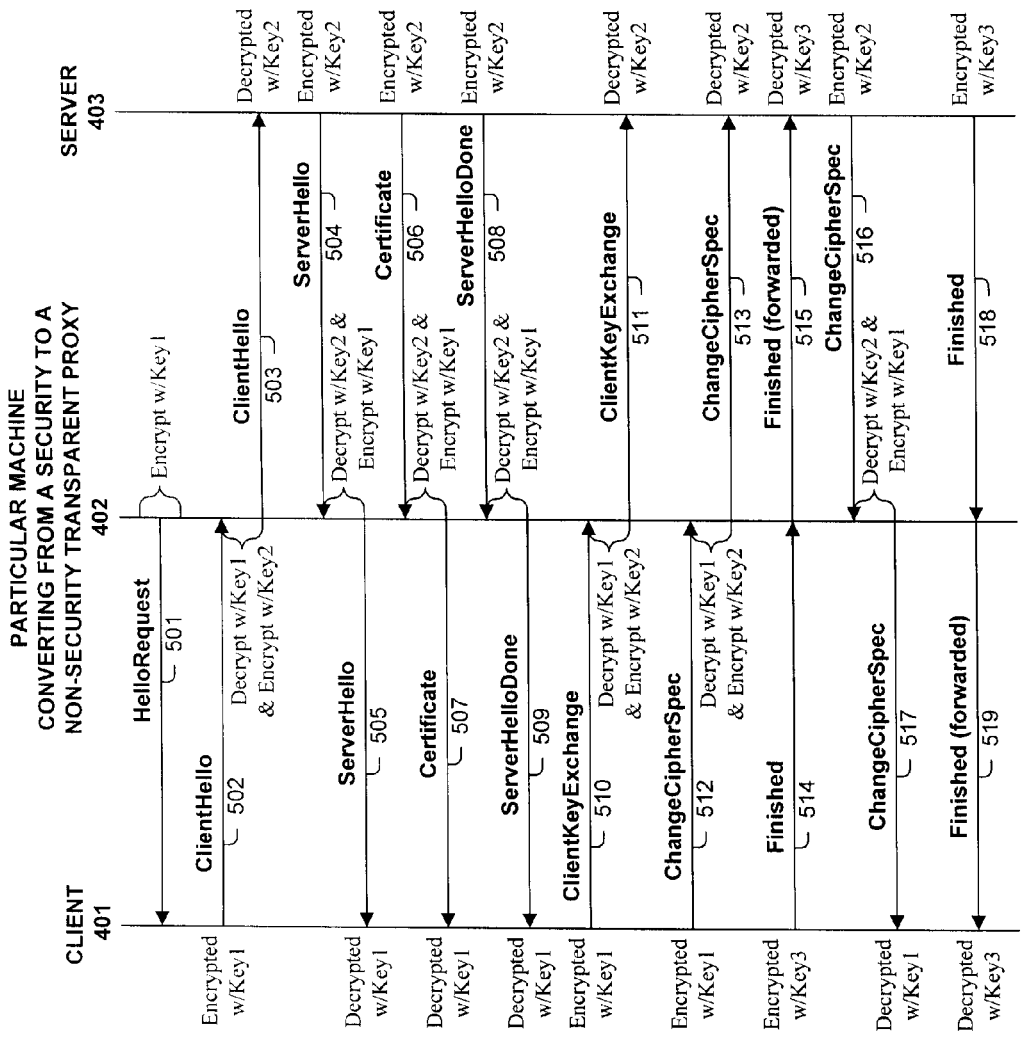
FIG. 5 illustrates a process performed in one embodiment.

FIG. 5 illustrates a process performed in one embodiment for causing the two secure communications sessions between Particular Machine 402 and Client 401 and server 402 to renegotiate their encryption keys such that each session will use the same particular encryption key, thus allowing particular machine to gracefully convert from its role as a security transparent proxy to a non-security transport proxy. FIG. 5 is based on Transport Layer Security (TLS) as described in RFC 4346, which is hereby incorporated by reference.

In response to some policy determination or other stimulus, Particular Machine 402 initiates/causes the renegotiation of the encryption keys of the two communications sessions. The following is one such sequence performed to cause key renegotiation such that Client 401 and Server 403 use a same particular key. By monitoring the key renegotiation messages, Particular Machine 402 identifies when it can switch from acting as a security transparent proxy (where it decrypts a received packet with one key, and encrypts it with a second key and sends it to the other destination) to acting as a non-security transparent proxy (where it can simply forward received encrypted packets to the other destination, without performing any decryption nor encryption). One such sequence of messages, of an extensible number of such sequences of messages in keeping with the scope, spirit and teachings presented herein, is presented hereinafter.

Particular Machine 402 sends (501) a Hello Request message, encrypted using the first key, to Client 401, which decrypts it using the first key.

Client 401 sends (502) a ClientHello message, encrypted using the first key, over the secure session to Particular Machine 402, which decrypts the received packet using the first key and encrypts the ClientHello message using the second key, and sends (503) it to Server 403, which decrypts it using the second key.

Server 403 sends (504) a ServerHello message, encrypted using the second key, over the secure session to Particular Machine 402, which decrypts the received packet using the second key and encrypts the ServerHello message using the first key, and sends (505) it to Client 401, which decrypts it using the first key.

Server 403 also sends (506) a Certificate message, encrypted using the second key, over the secure session to Particular Machine 402, which decrypts the received packet using the second key and encrypts the Certificate message using the first key, and sends (507) it to Client 401, which decrypts it using the first key.

Server 403 also sends (508) a ServerHelloDone message, encrypted using the second key, over the secure session to Particular Machine 402, which decrypts the received packet using the second key and encrypts the ServerHelloDone message using the first key, and sends (509) it to Client 401, which decrypts it using the first key.

Client 401 sends (510) a ClientKeyExchange message, encrypted using the first key, over the secure session to Particular Machine 402, which decrypts the received packet using the first key and encrypts the ClientKeyExchange message using the second key, and sends (511) it to Server 403, which decrypts it using the second key. Note, this ClientKeyExchange message includes the new key information (e.g., the same particular key, key3, third key) that will be used by both Client 401 and Server 403 at the completion of this key renegotiation of the keys used for the secure sessions between Client 401 and Particular Machine 402, and between Server 403 and Particular Machine 402.

Client 401 also sends (512) a ChangeCipherSpec message, encrypted using the first key, over the secure session to Particular Machine 402, which decrypts the received packet using the first key and encrypts the ChangeCipherSpec message using the second key, and sends (513) it to Server 403, which decrypts it using the second key.

Client 401 also sends (514) a Finished message, encrypted using the new third key, over the secure session to Particular Machine 402, which forwards (515) the encrypted received packet to Server 403, which decrypts it using the third key. Note, Particular Machine 402, by monitoring the key renegotiation messages being communicated between Client 401 and Server 403, knows at this point that it switches from being a security transparent proxy (which decrypts and encrypts messages/packets) to a non-security transparent proxy (which forwards, without decryption and encryption operations) for received encrypted packet going from Client 401 to Server 403.

Server 403 sends (516) a ChangeCipherSpec message, encrypted using the second key, over the secure session to Particular Machine 402, which decrypts the received packet using the second key and encrypts the Change- CipherSpec message using the first key, and sends (517) it to Client 401, which decrypts it using the first key.

Server 403 also sends (518) a Finished message, encrypted using the new third key, over the secure session to Particular Machine 402, which forwards (519) the encrypted received packet to Client 401, which decrypts it using the third key. Note, Particular Machine 402, by monitoring the key renegotiation messages being communicated between Server 403 and Client 401, knows at this point that it switches from being a security transparent proxy (which decrypts and encrypts messages/packets) to a non-security transparent proxy (which forwards, without decryption and encryption operations) for received encrypted packet going from Server 403 to Client 401.

At this point, the secure communication sessions between Client 401 and Particular Machine 402, and between Server 403 and Particular Machine 402 are using the same particular encryption key, which allows Particular Machine 402 to gracefully convert from a security to a non-security transparent proxy and simply forward messages between the two sessions (without having to decrypt/encrypt with a first key and encrypt/decrypt using the second key), as Client 401 and Server 403 can decode using the same particular key used for the bridged secure communications sessions.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method, performed by a particular machine, the method comprising:
    acting, by the particular machine, as a security transparent proxy, including using decryption and encryption, to bridge packets of a first secure session with a client and packets of a second secure session with a server, with the first secure session using a first key, and with the second secure session using a second key different than the first key;
    while said acting as the security transparent proxy, initiating key renegotiation resulting in the client, with the first secure session, and the server, with the second secure session, using a same particular key; and
    acting as a non-security transparent proxy subsequent to said key renegotiation, which includes: receiving packets from the first secure session and forwarding, without decrypting nor encrypting using the particular key, to the server over the second secure session, and receiving packet from the second secure session and forwarding, without decrypting nor encrypting using the particular key, to the client over the first secure session, such that neither the first secure session nor the second secure session is dropped between said acting as the security transparent proxy to acting as the non-security transparent proxy.

2. The method of claim 1, wherein the first key is not the same as the particular key; and the second key is not the same as the particular key.

3. The method of claim 1, wherein the first key is the same as the particular key.

4. The method of claim 1, wherein the second key is the same as the particular key.

5. The method of claim 1, wherein the first secure session uses one from a group consisting of: Secure Sockets Layer (SSL) and Transport Layer Security (TLS); and wherein the second secure session uses one from a group consisting of: SSL and TLS.

6. The method of claim 1, wherein said key renegotiation is performed in response to identifying based on a policy decision that the particular machine should not act as said security transparent proxy.

7. The method of claim 6, wherein said policy decision is defined based on one or more from a group consisting of in an access control list, using an identity of the client, using an identity of the server, using a reputation of the client, and using a reputation of the server.

8. The method of claim 1, wherein said key renegotiation includes the particular machine acting as the security transparent proxy including using decryption and encryption to bridge key renegotiation packets sent between the client and the server.

9. The method of claim 8, wherein the particular machine switches to acting as the non-security transparent proxy in response to identifying completion of said key renegotiation resulting in the client and server using the same particular key by monitoring said key renegotiation packets sent between the client and the server.

10. The method of claim 1, wherein the particular machine switches to acting as the non-security transparent proxy in response to identifying completion of said key renegotiation resulting in the client and server using the same particular key by monitoring said key renegotiation packets sent between the client and the server.

11. An apparatus, comprising:
    one or more network interfaces configured to communicate with a client and with a server; and
    one or more processors and memory configured to perform operations, with said operations including:
        acting as a security transparent proxy, including using decryption and encryption, to bridge packets of a first secure session with the client and packets of a second secure session with the server, with the first secure session using a first key, and with the second secure session using a second key different than the first key;
        while said acting as the security transparent proxy, initiating key renegotiation resulting in the client, with the first secure session, and the server, with the second secure session, using a same particular key; and
        acting as a non-security transparent proxy subsequent to said key renegotiation, which includes: receiving packets from the first secure session and forwarding, without decrypting nor encrypting using the particular key, to the server over the second secure session, and receiving packet from the second secure session and forwarding, without decrypting nor encrypting using the particular key, to the client over the first secure session, such that neither the first secure session nor the second secure session is dropped between said acting as the security transparent proxy acting as the non-security transparent proxy.

12. The apparatus of claim 11, wherein the first key is not the same as the particular key; and the second key is not the same as the particular key.

13. The apparatus of claim 12, wherein the first secure session uses one from a group consisting of: Secure Sockets Layer (SSL) and Transport Layer Security (TLS); and wherein the second secure session uses one from a group consisting of: SSL and TLS.

14. The apparatus of claim 13, wherein the apparatus switches to acting as the non-security transparent proxy in response to identifying completion of said key renegotiation resulting in the client and server using the same particular key by monitoring said key renegotiation packets sent between the client and the server.

15. The apparatus of claim 11, wherein said key renegotiation is performed in response to identifying based on a policy decision that the apparatus should not act as said security transparent proxy.

16. The apparatus of claim 11, wherein said key renegotiation includes the apparatus acting as the security transparent proxy including using decryption and encryption to bridge key renegotiation packets sent between the client and the server.

17. The apparatus of claim 16, wherein the apparatus switches to acting as the non-security transparent proxy in response to identifying completion of said key renegotiation resulting in the client and server using the same particular key by monitoring said key renegotiation packets sent between the client and the server.

* * * * *

UNITED STATES PATENT AND TRADEMARK OFFICE
CERTIFICATE OF CORRECTION

PATENT NO. : 8,190,879 B2  Page 1 of 1
APPLICATION NO. : 12/641077
DATED : May 29, 2012
INVENTOR(S) : Jianxin Wang It is certified that error appears in the above-identified patent and that said Letters Patent is hereby corrected as shown below:

Col. 10, Claim 7, line 15, replace "consisting of in an" with -- consisting of: in an --

Signed and Sealed this
Seventh Day of August, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,190,879 B2 | Page 1 of 1 |
| APPLICATION NO. | : 12/641077 | |
| DATED | : May 29, 2012 | |
| INVENTOR(S) | : Wang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this
Twenty-eighth Day of August, 2012

David J. Kappos
*Director of the United States Patent and Trademark Office*